United States Patent [19]

Bertling

[11] Patent Number: 4,974,778
[45] Date of Patent: Dec. 4, 1990

[54] HEATING SYSTEM FOR OCCUPANT SPACES IN POWER VEHICLES WITH LIQUID-COOLED INTERNAL COMBUSTION ENGINES

[75] Inventor: Johannes-Gerhard Bertling, Vaihingen, Fed. Rep. of Germany

[73] Assignee: Robert Bosch GmbH, Stuttgart, Fed. Rep. of Germany

[21] Appl. No.: 385,559

[22] Filed: Jul. 24, 1989

[30] Foreign Application Priority Data

Sep. 22, 1988 [DE] Fed. Rep. of Germany ....... 3832966

[51] Int. Cl.$^5$ .............................................. B60H 1/02
[52] U.S. Cl. ................................. 237/12.3 B; 122/26; 126/247
[58] Field of Search ............. 237/12.3 R, 1 R, 12.3 B; 122/26; 126/247

[56] References Cited

U.S. PATENT DOCUMENTS 3,591,079 7/1971 Peters ......................... 237/12.3 B X
4,781,151 11/1988 Wolpert, Jr. et al. ................. 122/26

FOREIGN PATENT DOCUMENTS 1476328 6/1972 Fed. Rep. of Germany .

Primary Examiner—Albert J. Makay
Assistant Examiner—John Sollecito
Attorney, Agent, or Firm—Michael J. Striker

[57] ABSTRACT

A heating system for an occupant space of a power vehicle with a liquid-cooled internal combustion engine comprises a heating unit including a chamber, an element accommodated in the chamber and rotatable by an internal combustion engine, an immovable structural part forming at least one gap with the element, the chamber being filled with a viscous liquid and rinsed by a cooling liquid of the internal combustion engine, a heat exchanger arranged in the occupant space of the power vehicle, and means for supplying the cooling liquid from the heating device to the heat exchanger and from there through the internal combustion engine back to the heating device.

12 Claims, 2 Drawing Sheets

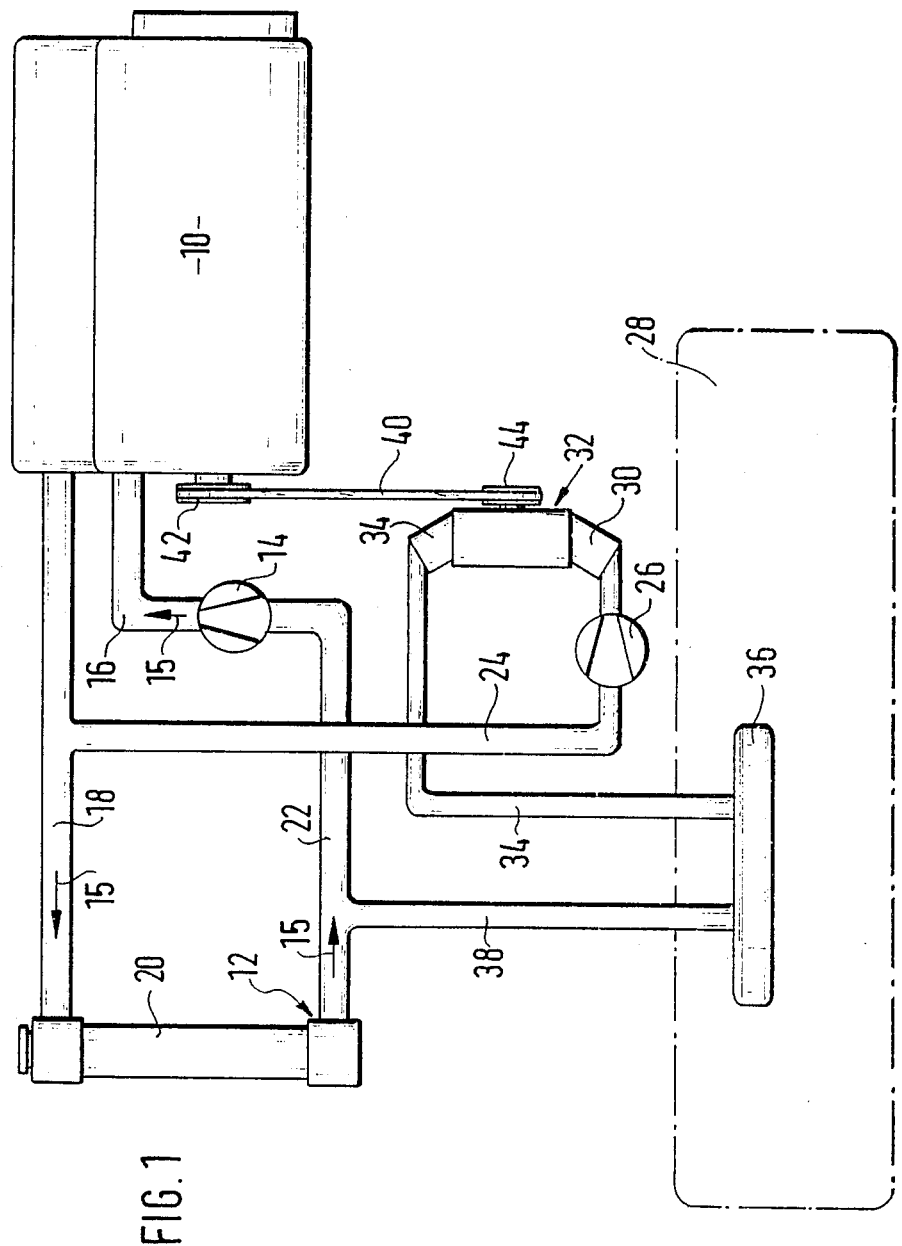

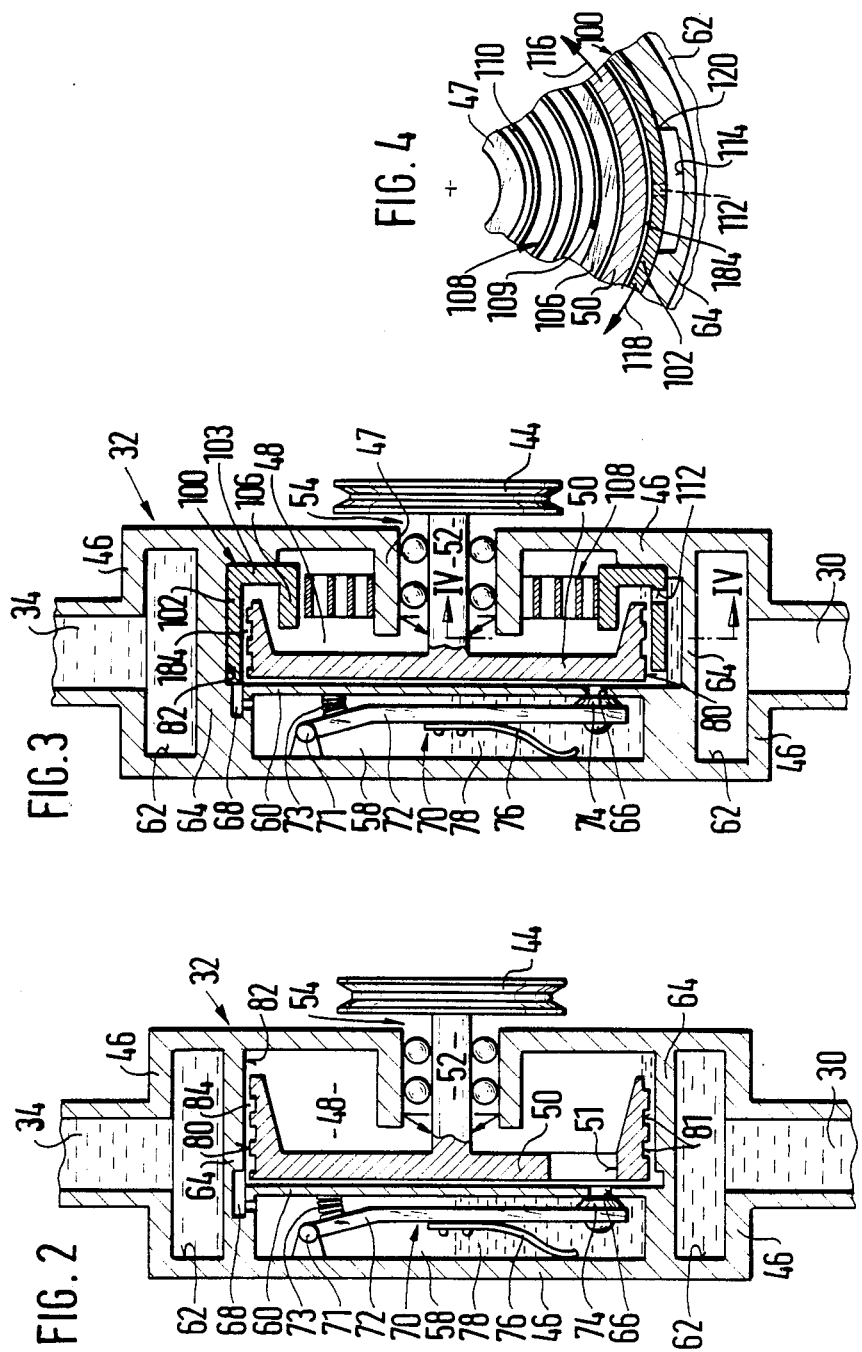

HEATING SYSTEM FOR OCCUPANT SPACES IN POWER VEHICLES WITH LIQUID-COOLED INTERNAL COMBUSTION ENGINES

BACKGROUND OF THE INVENTION

The present invention relates to a heating system for occupant spaces of power vehicles with liquid-cooled internal combustion engines.

During starting a vehicle motor after a long period of non-driving, first no heating energy for the occupant space is available. For example in modern PKW diesel motors which operate with high efficiency, such operational conditions are possible in which no sufficient heating energy is produced over long distances of travel. For such instances a cost-effective additional heating device is an advantageous alternative, which operates in satisfactory manner but involves expensive stationary heating.

The present invention deals with a heating system in which an element which is rotatably driven by the internal combustion engine is arranged in a medium-filled chamber and associated with a stationary structural part so as to form at least one gap therebetween. The heating system of this type is known for example from the German document DE-OS 1,476,328. In this system a heating aggregate is connected parallel to a cooling medium circulating circuit for the internal combustion engine and includes a substantially a fuel consuming burner and a boiler. For supplying hot water to a heat exchanger for the vehicle heating, the water must be heated in the boiler to steam generation. A filling of the boiler with cold water from the water casing of the internal combustion engine is performed after sinking of the water level in the boiler and releasing the steam in the water casing through a float valve. Such a heating arrangement operates in a varying fashion and its operational process is complicated. Furthermore, in certain operational conditions of the known combustion engine the heating output of the heating system is imperfect.

Another known heating system disclosed in the German reference DE-OS 3,147,468 operates in accordance with the principle of the hydrodynamic rate. In this system cooling water accelerated by the impeller is delayed in the impeller chamber of the stator. The kinetic energy is directly converted into heat in the rotating cooling water volume, so that a relatively high efficiency is achieved. The disadvantage is however that the heating systems working on the principle of hydrodynamic brake have such an output characteristic which is dependent on the third power of the drive number of revolutions. Therefore in the region of low number of revolutions a proportionally low heating output is produced.

SUMMARY OF THE INVENTION

Accordingly, it is an object of the present invention to provide a heating system for occupant spaces of power vehicles which avoids the disadvantages of the prior art.

More particularly it is an object of the present invention to provide a heating system for occupant spaces of power vehicles, in which in operational conditions of the internal combustion engine which are not favorable heating, fast, reliable and sufficient heat can be produced, since the heating system is formed in accordance with the principle viscous brake which increases the heat generation with the second power of the number of revolutions of the drive.

In keeping with these objects and with others which will become apparent hereinafter, one feature of the present invention resides, briefly stated, in a heating system in which a viscous liquid is located in the chamber, the chamber is rinsed with a cooling liquid of the internal combustion engine, and the cooling liquid flows from the heating device to a heat exchanger in an occupant space and from there through the internal combustion engine again to the heating device.

When the heating system is designed in accordance with the present invention, it achieves the above specified objects. Since the system operates in accordance with the principle of viscous brake and the heat generation depend on the second power of the number of revolutions of the drive, a sufficient heating output is available also in the lower region of the number of revolutions. Further, the construction of the heating system is simple and compact. It can operate in a wear-free manner and with low expenses. Due to the Newton friction between the rotatable element and the immovable structural parts, a braking output is produced and used as heat of the heating system. The braking output of the heating system adds thereby to the heat output attributed by the drive motor.

In accordance with another feature of the present invention, the heating device of the heating system is connected with the cooling medium circulating circuit of the internal combustion engine in a conductive manner.

Still another feature of the present invention is that the supply conduit of the heating system and the discharge conduit of the same are connected with the cooling medium circulating circuit behind the internal combustion engine as considered in the flow direction of the cooling fluid and through the heat exchanger leading before the internal combustion engine respectively, and a cooler of the cooling medium circulating circuit is located between the connection points of these conduits. A feeding aggregate for the cooling liquid can be arranged in the supply conduit.

A valve which surrounds the chamber can be provided with one passage for the cooling fluid of the internal combustion engine, and the supply conduit and the discharge conduit can be connected with the passage.

The rotatably driven element can be formed as a wheel supported in the wall of the chamber and having a peripheral surface which forms the gap with a region of the inner side of the wall chamber.

In accordance with a further feature of the present invention a viscous liquid supply chamber is arranged in the wall of the chamber near the wheel in direction of its axis of rotation. In its lower region the supply chamber is connected with the wheel accommodating chamber in a conductive manner. The conduit in the wheel chamber of the supply chamber can be closed and opened by a member which operates in a temperature-dependent manner.

The wheel accommodating chamber can be provided in its upper region with a passage leading to the supply chamber. The shipping device for viscous liquid can be arranged in an opening of the passage and act on the peripheral surface of the wheel. The wheel can be provided with such a profile on its peripheral surface that the viscous liquid is transported to the stripper.

A ring can be rotatably guided on the wall of the chamber and surround the peripheral surface of the wheel. Its inner wall forms a limit for the gap at the peripheral surface.

At least one depression can be provided in the deepest region of the chamber in the wall of the chamber, and the ring can be provided with at least one substantially radially extending opening which in a first operational condition of the ring opens into the depression. In a second operational condition the ring is rotatable so that the opening is located outside of the depression.

Finally, in accordance with still a further feature of the present invention, the ring can be prestressed opposite to the direction of rotation of the wheel. The prestressing can be achieved by a spiral spring with one end mounted on the ring, and another end mounted on the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a cooling medium circulating circuit of a liquid-cooled internal combustion engine with a heating system in accordance with the present invention for occupant space of a power vehicle driven by an internal combustion engine;

FIG. 2 is a view showing a section of a heating device forming a part of the inventive heating system;

FIG. 3 is a view showing a section corresponding to the section of FIG. 2, but illustrating another embodiment of the heating device; and FIG. 4 is a view showing a section taken along the line IV—IV through the heating device of FIG. 3.

DESCRIPTION OF THE PREFERRED EMBODIMENTS

FIG. 1 shows an internal combustion engine 10 of a not shown power vehicle. It is cooled with a liquid through a cooling medium circulating circuit 12. For this purpose the cooling medium circuit 12 has a cooling medium pump 14 which is conductively connected with a pressure conduit 16 with not shown cooling medium passages in the housing of the internal combustion engine 10. A conduit 18 is further connected with the passages of the internal combustion engine 10 and leads from the internal combustion engine 10 to an air-cooled cooler 20. The cooler 20 is connected via a return conduit 22 with the cooling medium pump 14. The pump supplies the cooling fluid in direction of the arrow 15 through the pressure conduit 16 and the passages of the internal combustion engine 20 into the conduit 18. The cooling medium flows from the conduit 18 into the cooler 20 and from there after being cooled is supplied through the conduit 22, the cooling medium pump 14 and the pressure conduit 16 into the casing of the internal combustion engine.

The conduit 18 which leads the heated cooling medium is connected with a supply or branching conduit 24 leading to a feeding pump 26. The latter belongs to a heating device for the passenger space 28 of the power vehicle. From the feeding pump 26, a connecting conduit 30 leads to the heating aggregate 32. The heating conduit 34 leads from the heating aggregate 32 to a heat exchanger 36 in the passenger space 28 of the power vehicle. A conduit 38 extends from the heat exchanger 36 and is conductively connected with the return conduit 22 of the cooling medium circuit 12. The heating aggregate 32 is drivingly connected via a belt drive 40 with a output shaft 42 of the internal combustion engine 10. The belt drive 40 includes a belt pulley 44 of the heating aggregate 32 which is shown in section in FIG. 2 and will be later explained in detail.

The heating aggregate 32 has a housing 46 which forms a working chamber 48. A wheel 50 with a cup-shaped cross-section is arranged in the working chamber and connected via a drive shaft 52 with a belt pulley 44 located outside of the heating aggregate 32. The drive shaft 52 is supported at 54 in the housing 46 of the aggregate. A supply chamber 58 is located at the left side of the working chamber 48 which is opposite to the belt pulley 44. It is also enclosed by the housing 46. The supply chamber 58 is separated from the working chamber 48 by a partition 60. The working chamber 48 is substantially cylindrical, and its cylinder axis is identical to the axis of rotation of the drive shaft 52. The working chamber 48 is surrounded by a ring chamber 62. The latter is closed by a housing wall 46 of the heating aggregate 32 at its outer side. A ring-shaped partition 64 is located between the working chamber 48 and the ring chamber 62. The ring chamber 62 is connected with the feeding conduit 34 and with the connecting conduit 30 in a conductive manner, as can be seen from FIG. 1.

A throughgoing opening 66 is provided in the lower region of the partition 60 for connecting the supply chamber 58 with the working chamber 48. A connecting passage 68 is arranged in the upper region of the supply chamber 58 and connects the supply chamber 58 with the working chamber 48. It is important that the inlet of the connecting passage 68 to the working chamber 48 is made on its peripheral surface. The connecting passage 68 opens near the intermediate partition 60 in the region of the outer cup-shaped wall of the cup-shaped wheel 50 in the working chamber 48. Finally, a closing device is provided in the supply chamber 58 for the throughgoing opening 66. The closing device has a lever 72 which is supported on its one side at the point 71 and also supported via an elastic element 73 on the partition 60. Near its free end the lever 72 is provided with a closing element 74 which in the operative position of the lever 72 closes the throughgoing opening 66. This operative position is shown in FIG. 2.

The operative position is activated in this embodiment by a leaf spring 76 which is made of a bimetal. The leaf spring 76 is arranged on the lever 72 at its side facing away of the partition 60 and abuts with a prestress against the outer partition 46 of the heating aggregate 32. In the operative position shown in FIG. 2 the prestress of the leaf spring 76 is greater than the force of the elastic element 73 activating the opening direction of the closing element 74. Finally, as can be seen from FIG. 2, the supply container 58 is filled approximately to its half with a viscous liquid 78. The wheel 50 is provided with a plurality of openings 51 in the region of its cup-shaped bottom at the height of the throughgoing opening 66. One of such openings is shown in FIG. 2. The openings 51 are provided for permitting the viscous liquid to flow through the throughgoing opening 66 at the side of the wheel 50 opposite to the partition 60 and into the working chamber 48. The wheel 50 at its outer cup-shaped wall 80 is provided with a thread-like structure which is formed in this embodiment as a groove 81, the pitch of the groove 81 is selected so that when the wheel 50 rotates the viscous liquid is pressed to the connecting passage 68.

The heating arrangement 32 operates in the following manner:

When the internal combustion engine is rotating, the heating aggregate 32 is set in operation through the belt drive 40, 42, 44. When the cooling medium circulating circuit 12 does not yet reach the temperature required for heating, the bimetal spring 72 releases the throughgoing opening 66 in the partition 60 since the force of the elastic element 73 feeds the tightening force of the bimetal ring 76. The viscous liquid 78 flows from the supply chamber 58 into the working chamber 48 through the throughgoing opening 66 which acts as a conduit. Then it flows through the opening 51 to the side of the wheel 50 opposite to the partition 60. There it is taken along the wheel 50, and is located substantially between the outer peripheral surface 80 of the wheel 50 and the associated cylindrical inner wall 82 of the working chamber 48. These walls which face toward one another limit a ring gap 84 identified as a working or friction gap. The viscous liquid 78 is selected so that a high inner friction is produced which leads to a fast heating of the viscous liquid 78 in the working chamber 48. This heat is supplied through the partition 64 to the cooling liquid located in the ring chamber 62. There, the heat is supplied through the heating conduit 34 to the heat exchanger 36 and from there through conduit 38 to the return conduit 22 of the cooling medium circulating circuit 12. The heating pump 26 transports this cooling fluid through the branch conduit 24 and connecting conduit 30 into the ring chamber 62 of the heating aggregate 32. Since the branch conduit 34 is connected with the conduit 18 leading from the internal combustion engine 10 to the cooler 20, the small heat which can be available there is used for heating the occupant space 24. With increasing heating aggregate 32 the bimetal spring 76 is tensioned more and more until its tensioning force exceeds the opposite force of the elastic element 73 and the closing member 74 closes the throughgoing opening 66 in the partition 60. The overflowing viscous liquid 78 located in the working chamber 48 is stripped by a not shown stripper in the region of the connecting channel 68 from the wheel 50. It is returned through the connecting passage 68 again to the supply chamber 58. Thereby with the closed throughgoing opening 66 an operational position is reached in a short time. In this position the residual viscous liquid accommodated in the working chamber 48 is not sufficient to achieve a heat generation in the heating aggregate 32. If such a heat generation is again required, the bimetal spring 76 calibrated to a predetermined temperature produces a new heating process. In this process, it changes its prestress so that the prestressed elastic element 73 assumes the position in which the lever 72 is turned in counterclockwise direction and thereby opens the throughgoing opening 66.

In the embodiment shown in FIGS. 3 and 4, the construction of the heating aggregate 132 substantially corresponds to the construction of the above described heating aggregate 32. The parts of the aggregate which are identical to the parts of the aggregate in FIG. 2 are identified with the same reference numerals. However, the embodiment of FIGS. 3 and 4 deviates from the embodiment in FIG. 2 in several aspects. A ring 100 is rotatably guided on the inner peripheral surface 82 of the partition 64 which surrounds the outer peripheral surface 80 of the wheel 50. The ring 100 has a base ring 102 with a substantially rectangular cross-section and a length extending parallel to the axis of rotation of the wheel 50. The base ring 102 further has a projection 103 which extends transversely to the axis of rotation and crosses the cup edge of the cup-shaped wheel 50. Finally, an inner piece 106 of the ring 100 extends into the interior of the cup of the wheel 50. One end 109 of a spiral spring 108 is mounted on the inner wall of the piece 106. Its another end 110 is fixed on a bearing gear 46 of the bearing 54 for the drive shaft 52, the bearing gear extending into the working chamber 48 as can h=seen from FIG. 4. Further, a control opening 112 is provided in the lower region of the ring 100 in the base ring 102. The control opening 112 leads from the working chamber 48 to a depression 114 arranged in the partition 64 between the working chamber 48 and the ring chamber 62. The rotary direction of the wheel 50 is identified in FIG. 4 with an arrow 116. The spiral spring 108 is prestressed opposite to the rotary direction 116 in direction of the arrow 118. As seen in the rotary direction 118, a limit of the depression 114 forms a control edge 120 for the opening 112. The friction gap 184 in this embodiment is formed in the outer peripheral surface 80 of the wheel 50 and the inner peripheral surface of the base ring 102 of the ring 100. The ring 100 is prestressed by the spiral spring 108 so that the opening 112 is located in the region of the depression 114 as shown in FIG. 4. When the friction moment produced between the wheel 50 and the inner wall of the base ring 102 exceeds the prestress of the spiral spring 108, the ring 100 is taken along in direction of rotation 116 and the increase of the pretension in the spiral spring 108 in direction of the arrow 116 increases until the opening 112 is located behind the limit of the depression 114 serving as the control edge 120. Thereby a simple limit of the maximum friction moment is possible. By taking along of the spring 100 in the above mentioned manner, further discharge openings which correspond to the passage 68 can be released, so that an accelerated return transporting of the viscous liquid into the supply container 58 occurs.

In the shown embodiments a joint feature is that during the operation of the heating device a viscous liquid 78 is located in the chamber 50, the chamber is sprayed by the cooling fluid of the internal combustion engine 10, and this cooling fluid flows from the heating device to a heat exchange 36 in the occupant space 28 and from there flows out via the internal combustion engine 10 again to the heating device 32.

While the embodiment of FIGS. 3 and 4 the element (ring 100) limiting the friction gap is transitorily rotatable in certain operational conditions, it is considered as frame-fixed in the sense of the invention, since during the heating phase it is frame-fixed contrary to the element (wheel or peripheral wheel surface 80) limiting the friction gap from the opposite side.

It will be understood that each of the elements described above, or two or more together, may also find a useful application in other types of constructions differing from the types described above.

While the invention has been illustrated and described as embodied in a heating device for occupant spaces in a power vehicle with a liquid-cooled internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A heating system for an occupant space of a power vehicle with a liquid-cooled internal combustion engine, comprising a heating unit including a chamber, said element accommodated in said chamber and rotatable by an internal combustion engine; an immovable structural part forming at least one gap with said element, said chamber being filled with a viscous liquid and rinsed by a cooling liquid of the internal combustion engine; a heat exchanger arranged in the occupant space of the power vehicle; means for supplying the cooling liquid from said heating device to said heat exchanger and from there through said internal combustion engine back to said heating device, said element being formed as a rotatable wheel, said chamber having a chamber wall forming said structural part, so that said gap is formed between said rotatable wheel and said chamber wall, said wheel having an axis of rotation; and further comprising means forming a viscous liquid supply chamber provided in a said chamber wall near said wheel in direction parallel to said axis of rotation.

2. A heating system as defined in claim 1 and further comprising means for connecting said heating device with a cooling liquid circulating circuit of the internal combustion engine.

3. A heating system as defined in claim 2; and further comprising a supply conduit connected with said circulating circuit and a discharge conduit connected with said circulating circuit through said heat exchanger in respective connecting points; and further comprising a cooler for said circulating circuit and provided between said connecting points.

4. A heating system as defined in claim 1, wherein said wheel has a cylindrical peripheral surface, said chamber wall having an inner side, said gap being formed between said peripheral surface of said wheel and said inner side of said chamber wall.

5. A heating system as defined in claim 3, wherein said heating device has a wall which surrounds said chamber and is provided with at least one passage for the cooling liquid of the internal combustion engine, said supply conduit and said discharge conduit being connected with said passage.

6. A heating system as defined in claim 1, wherein said supply chamber has a lower region which communicates with said chamber accommodating said wheel in a conductive manner.

7. A heating system as defined in claim 1; and further comprising a conduit extending between said chamber accommodating said wheel and said supply chamber; and a member which is actuatable in dependence upon temperature and arranged to close and to open said conduit.

8. A heating system for an occupant space of a power vehicle with a liquid-cooled internal combustion engine, comprising a heating unit including a chamber, an element accommodated in said chamber and rotatable by said internal combustion engine; an immovable structural part forming at least one gap with said element, said chamber being filled with a viscous liquid and rinsed by a cooling liquid of the internal combustion engine; a heat exchanger arranged in the occupant space of the power vehicle; means for supplying the cooling liquid from said heating device to said heat exchanger and from there through said internal combustion engine back to said heating device, said element being formed as a rotatable wheel, said chamber having a chamber wall forming said structural part, so that said gap is formed between said rotatable wheel and said chamber wall, said chamber accommodating said wheel being provided in its upper region with a passage which leads to a viscous liquid supply chamber provided in said chamber wall and has a region facing toward said chamber accommodating said wheel; and stripping means located in said region of said passage and acting on a peripheral surface of said wheel for stripping the viscous liquid.

9. A heating system as defined in claim 8, wherein said wheel is provided on its peripheral surface with a profile which transports the viscous liquid toward said stripping means.

10. A heating system for an occupant space of a power vehicle with a liquid-cooled internal combustion engine, comprising a heating unit including a chamber, an element accommodated in said chamber and rotatable by said internal combustion engine; an immovable structural part forming at least one gap with said element, said chamber being filled with a viscous liquid and rinsed by a cooling liquid of the internal combustion engine; a heat exchanger arranged in the occupant space of the power vehicle; means for supplying the cooling liquid from said heating device to said heat exchanger and from there through said internal combustion engine back to said heating device, said element being formed as a rotatable wheel, said chamber having a chamber wall forming said structural part, so that said gap is formed between said rotatable wheel and said chamber wall; and further comprising a ring which is rotatably guided on said chamber wall and surrounds the peripheral surface of said wheel, said ring having an inner surface which forms a limit for said gap.

11. A heating system as defined in claim 10, wherein said chamber wall has at least one depression, said ring having at least one substantially radially extending opening which opens into said depression in one operational condition of said ring.

12. A heating system as defined in claim 10, wherein said chamber has a deepest region, a depression being provided in said chamber wall in said deepest region.

* * * * *